(12) United States Patent
Xuan et al.

(10) Patent No.: US 6,214,434 B1
(45) Date of Patent: Apr. 10, 2001

(54) ISOLATED SINGLE-DOMAIN HIGH-DENSITY MAGNETIC RECORDING MEDIA AND METHOD OF MANUFACTURING THE MEDIA

(75) Inventors: Jialuo J. Xuan, Milpitas; Chung Y. Shih, Cupertino, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/075,876

(22) Filed: May 12, 1998

Related U.S. Application Data

(60) Provisional application No. 60/056,044, filed on Sep. 2, 1997, now abandoned.

(51) Int. Cl.⁷ .................................................. G11B 5/66
(52) U.S. Cl. .................. 428/64.2; 428/65.3; 428/65.6; 428/141; 428/694 T; 428/694 SG; 428/694 TS; 428/694 TR; 428/694 TM; 428/900; 427/128; 427/129; 427/130; 204/192.2; 205/119
(58) Field of Search .................. 428/141, 694 T, 428/694 SG, 694 TS, 694 TR, 694 TM, 64.2, 900, 65.3, 65.6; 427/128–131; 204/192.2; 205/119

(56) References Cited

U.S. PATENT DOCUMENTS 5,413,835 * 5/1995 Ikeda ...................................... 428/141

FOREIGN PATENT DOCUMENTS

0452876A2 * 10/1991 (EP).
0629998A2 * 12/1994 (EP).
7-58375 * 7/1995 (JP).

OTHER PUBLICATIONS

Bharat Bhushan, "Tribology and Mechanics of Magnetic Storage Devices", pp. 24–35 and 234–235, 1994.

Stephen Chou, "Ultrahigh–Density Recording: Storing Data in Nanostructures", Data Storage, Sep./Oct. 1995, pp. 35–40.

Robert O'Barr, "Single Column Per Bit Ultra Density Storage", Center For Magnetic Recording Research, Univ. of California, San Diego (UCSD), Apr. 8, 1987, Video Tape Code: VT–97–013, Abstract.

* cited by examiner

Primary Examiner—Leszek Kiliman
(74) Attorney, Agent, or Firm—McDermott, Will & Emery

(57) ABSTRACT

A magnetic recording medium and a process for making the same provides a plurality of micro- or nano-machined recesses in a non-magnetic carrier layer. The recesses are machined by a fiber laser and when filled with a magnetic material, provide isolated single-domains on the magnetic recording media. The micro- or nano-machining of the recesses produces single domains of extremely small dimensions to increase the recording density on magnetic recording media.

20 Claims, 5 Drawing Sheets

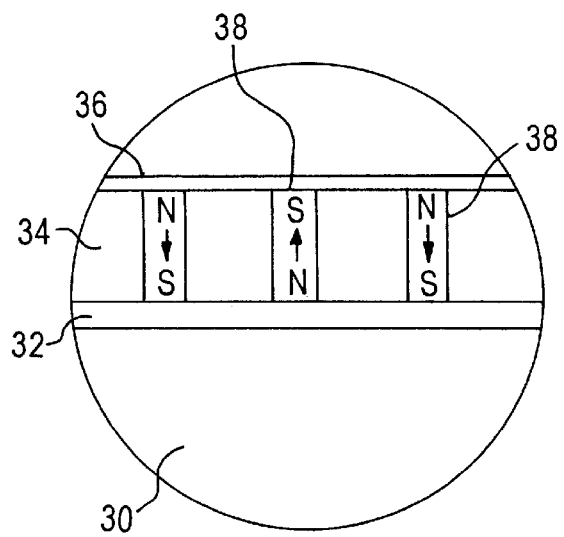
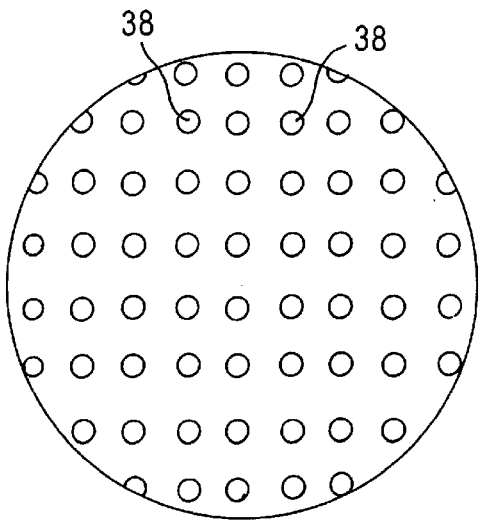
FIG. 3A                FIG. 3B
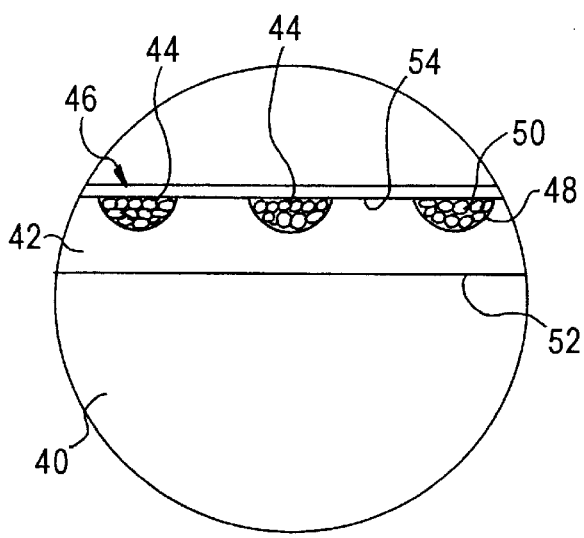
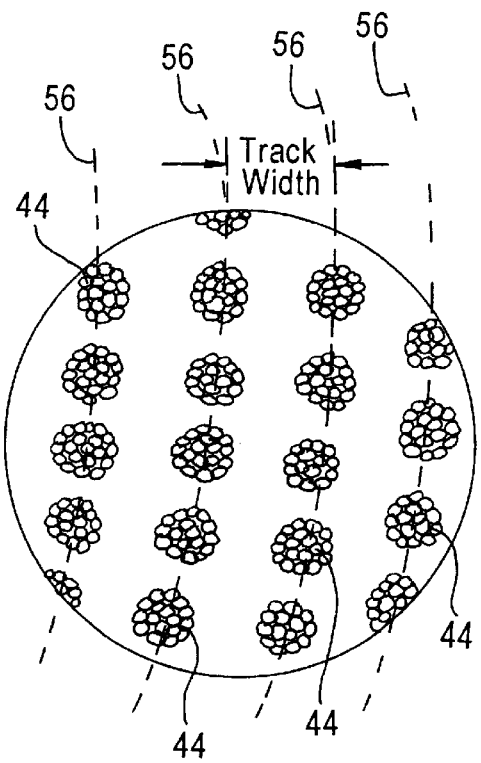
FIG. 4A                FIG. 4B

ISOLATED SINGLE-DOMAIN HIGH-DENSITY MAGNETIC RECORDING MEDIA AND METHOD OF MANUFACTURING THE MEDIA

RELATED APPLICATION

This application claims priority from provisional patent application Serial No. 60/056,044 filed Sep. 2, 1997 abandoned, entitled "STRUCTURE AND PROCESS OF THE WINCHESTER-TYPE ISOLATED SINGLE-DOMAIN HIGH-DENSITY MAGNETIC RECORDING MEIDA", the entire disclosure of which is hereby incorporated herein by reference.

FIELD OF THE INVENTION

The present invention relates to the field of magnetic recording media and more particularly, to high density recording media with isolated single-domains.

BACKGROUND OF THE INVENTION

The costs of electronic data storage have been dramatically reduced as the storage densities on recording media have increased. This trend is particularly evident in hard disk drive technology. A conventional magnetic recording disk 10 for use in hard disk drives is depicted in FIG. 1. A cross section A of FIG. 1 is enlarged and depicted schematically in FIG. 2A. A typical recording disk 10 includes an aluminum (Al) substrate 12 covered by a nickel-phosphorous (NiP) plating layer 14. A chromium (Cr) underlayer 16 is provided on the nickel phosphorous plating. A magnetic material such as nickel, cobalt (Co), or a magnetic alloy is electroplated or sputtered onto the chromium underlayer 16 to form a continuous magnetic layer 18. A carbon overcoat 20 is deposited on top of the magnetic layer 18 and serves to protect the magnetic layer 18.

An enlarged top view of section B of the recording disk 10 of FIG. 1 is depicted in FIG. 2B. This view is not a physical view, but rather one provided by a magnetic force microscope following writing of data onto the disk 10. As recorded by a write head, the bits are substantially rectangular in shape and arranged in concentric tracks. In the illustrated example, a track width is approximately 2,000 nm. A small separation exists between the bits within a track as well as between bits of radially adjacent tracks.

The approximate shape and dimensions of a bit of a conventional longitudinally recorded magnetic bit are provided in FIG. 5a. The length of the bit is approximately 2,000 nm, the width of the bit is approximately 150 nm, and the depth of the bit is approximately 15 nm. A magnetic disk 10 that has been formed with a continuous magnetic layer 18 as depicted in FIG. 2A with the bit size described above has a recording density of approximately 1.7 Gbit/in$^2$.

Increases in the areal density of magnetic storage media have been driven by the downward rescaling of hard drive assemblies. This resealing includes reducing the size of the grains making up the magnetic layer. In longitudinal recording, each bit is composed of numerous grains in order to maintain an adequate signal-to-noise ratio. However, reducing the grain size in order to reach higher storage densities is limited by the superparamagnetic limit. This limit occurs at the grain size at which thermal energy alone can trigger random magnetic switching of the grains.

A technology has been proposed to greatly increase the recording density of a magnetic disk by using discrete, single-domain magnetic elements embedded in a non-magnetic material. As proposed in *Ultra High-Density Recording Storing Data in Nanostructures,* Stephen Chou, *Data Storage,* September/October 1995 (pages 35–40), thin-film magnetic media are replaced by media that include discrete magnetic elements embedded in a non-magnetic disk. A corresponding cross-section A is depicted in FIG. 3A for a magnetic disk 10 having the proposed quantum magnetic structure. A silicon substrate 30 is covered by a plating base layer 32. A silicon dioxide layer 34 is provided on the plating base layer. The silicon dioxide forms a non-magnetic isolation layer in which magnetic columns are provided. The non-magnetic layer 34 has a depth of approximately 100 nm. Magnetic columns 38, approximately 50 nm in diameter, are provided in a vertical orientation in the non-magnetic layer 34. The magnetic columns 38 may be made of nickel or cobalt, for example. The non-magnetic layer 34 and the magnetic columns 38 are protected by an overcoat layer 36.

A schematic top sectional view of the proposed quantum magnetic disk is depicted in FIG. 3B, without the overcoat layer 36, to illustrate the arrangement of magnetic columns 38. In contrast to the magnetic force view of FIG. 2B, the view in FIG. 3B is a physical view. The centers of the magnetic columns 38 are separated by a distance of approximately 100 nm and are arranged in a grid-like manner. Each of the magnetic columns 38 represents a single bit for magnetic recording. The size of the bits (approximately 50 nm diameter) and the center-to-center separation of the columns (approximately 100 nm) produces a recording density of approximately 65 Gbit/in$^2$.

The costs associated with achieving such a large storage density are prohibitive as the proposed manufacture of quantum magnetic disks utilizes expensive semiconductor processing techniques. An exemplary fabrication process was described in Chuo as including electron beam lithography to define the size and location of each bit in the disk. After development and chrome etching, a reactive ion etching step is performed to create a silicon dioxide template with column openings. Nickel or another electromagnetic material is then electroplated into the column openings to form the magnetic columns. The disk is then polished to planarize its surface.

In addition to the greatly increased costs of manufacture of the disks, the proposed quantum magnetic disk requires complicated non-Winchester recording technology not currently available. Hence, although providing a very high recording density, the proposed magnetic disk remains an impractical alternative to conventional magnetic recording media.

SUMMARY OF THE INVENTION

There is a need for magnetic recording media that have a much higher recording density than conventional, longitudinally recorded magnetic media, but can still be used with conventional Winchester-type recording technology. There is also a need for a method of producing magnetic recording media that have a much higher recording density than conventional media but at a greatly reduced cost in comparison to manufacturing processes employing semiconductor processing techniques.

These and other needs are met by certain embodiments of the present invention which provide a magnetic recording medium comprising a carrier layer and means for magnetically recording data located in the carrier layer. In certain embodiments, the carrier layer is a non-magnetic layer with a top surface having a plurality of recesses and magnetic material located within the recesses. The recesses may have an average depth between approximately 20 and 80 nm and a radius between approximately 10 and 100 nm. The recesses may be arranged in tracks separated from each other by a center-to-center distance of approximately 50 nm to 200 nm.

The magnetic recording media of the present invention exhibits a high recording density (e.g. 60–120 Gbit/in$^2$) based on the dimensions of the recesses described above. Since the bits are isolated, the magnetic performance is high with low noise and no cross-talk between bits. Although the recording density is not as high as in quantum magnetic disks, it is an order of magnitude greater than conventional magnetic recording media. The media of the present invention can also be used with Winchester type recording technology.

The earlier stated needs are also met by certain embodiments of the present invention which provide a method of manufacturing a magnetic recording medium comprising the steps of machining recesses into a carrier layer and depositing a magnetic material in the recesses. In certain embodiments, the step of machining includes focusing laser energy on the top surface of the carrier layer to create the recesses. A continuous wave, pulsed or modulated laser beam is focused at the surface to produce very small holes (e.g. 20 nm diameter, 50 nm depth, 100 nm separation) by melting or ablating the carrier layer.

Once the small recesses are created in the non-magnetic carrier layer, the magnetic material may be deposited through electroplating or sputtering processes. Machining of recesses into a carrier layer and depositing magnetic material into the recesses is a less complicated and less expensive process of providing isolated single-magnetic domains on a magnetic recording medium than using semiconductor processes as proposed in the prior art. Hence, the machining of a non-magnetic carrier layer as in certain embodiments of the present invention produces a practical, high-density recording medium that may be implemented into current Winchester drive technology, and allows the shape of the bits to be changed by the laser-machining to match the heads used in the drive.

Additional advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3A is an enlarged schematic view of portion A of FIG. 1 for a quantum magnetic disk.

FIG. 3B is a top view depicting the topology of the top surface of portion B of FIG. 1 for a quantum magnetic disk.

FIG. 4A is a schematic depiction of a cross-section of portion A of FIG. 1 for a magnetic recording disk according to embodiments of the present invention.

FIG. 4B is a top view of portion B of FIG. 1 for a magnetic recording disk according to the embodiment of present invention.

DETAILED DESCRIPTION OF PREFERRED EMBODIMENTS

The present invention provides a magnetic recording media that has an isolated single-domain structure with a recording density approximately an order of magnitude greater than that of conventional magnetic media having continuous magnetic layers. The high-density magnetic recording media of the present invention, however, is relatively inexpensive to produce in comparison to technologies proposed to produce ultra-high density quantum magnetic disks.

Figure 1:
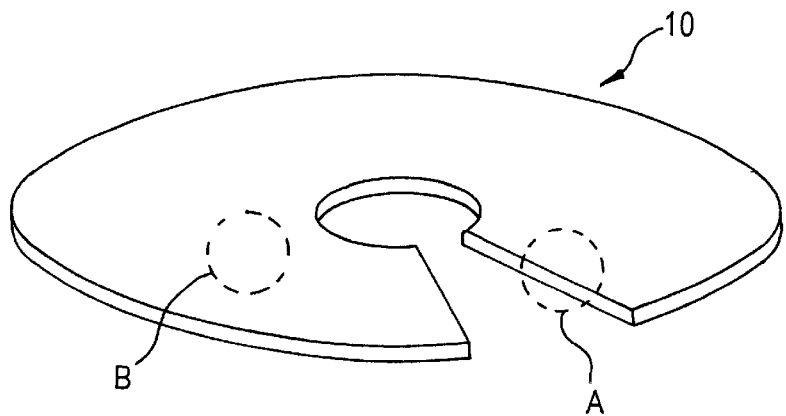
FIG. 1 is a perspective view of a magnetic recording disk with a partially cut-away section.

A cross-section of portion A of a magnetic recording disk 10 of FIG. 1 manufactured according to embodiments of the present invention is depicted in FIG. 4A. A non-magnetic carrier layer 42 is provided over a substrate 40. A wide variety of different types of substrate materials may be used to form the substrate layer 40. These include NiP, Al, glass, ceramic, MMC and AlBC, for example. Since semiconductor processes are not used to form the magnetic recording media according to the present invention, a greater number of different types of substrate materials may be employed in comparison to quantum magnetic recording media. Similarly, a large variety of different types of non-magnetic materials may be used in the non-magnetic carrier layer 42 such as chromium (Cr), silicon (Si), other metals or non-metals.

The recording disk 10 of the present invention has a plurality of isolated single-magnetic domains 44 within the carrier layer 42. Each domain 44 comprises a recess 48 machined in the carrier layer 42, and magnetic material 50 within the recess 48. The magnetic material may be nickel (Ni) or cobalt (Co), or magnetic alloys, for example, such as CoCrTi and CoCrPt. The domains 44 are physically and magnetically isolated from each other by the non-magnetic carrier layer 42. A conventional carbon overcoat layer 46 covers the top surface 54 of the carrier layer 42 and the domains 44.

Figures 2A, 2B:
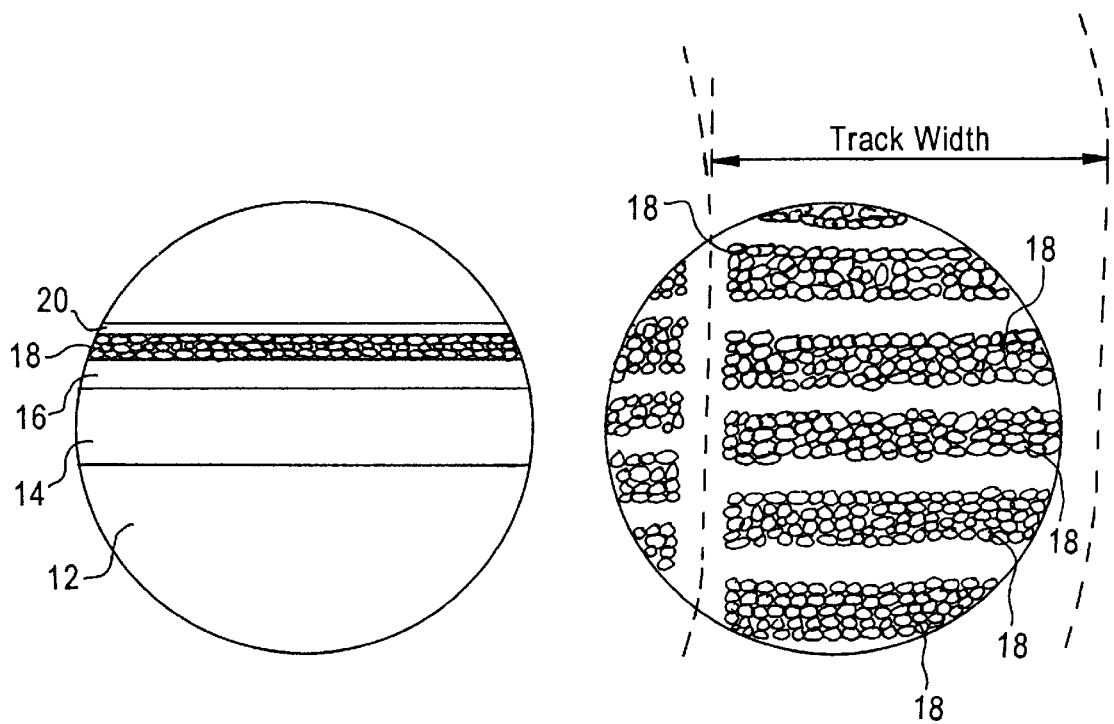
FIG. 2A is an enlarged schematic cross-section of portion A of FIG. 1 for a conventional magnetic disk having a continuous magnetic layer.
FIG. 2B is a top view of a portion B of FIG. 1 of a conventional magnetic disk as reproduced by a magnetic force microscope.

A top view of portion B of a disk 10 as configured in FIG. 1 is shown in FIG. 4B. In this exemplary embodiment, the single domains 44 are arranged on the disk 10 in concentric radial tracks 56. The track width is approximately 200 nm in the illustrated exemplary embodiment, as measured from center-to-center of the domains 44. Note that the view in FIG. 4B is a physical view with the overcoat layer 46 removed, in contrast to the magnetic force view of FIG. 2B.

Figure 5A:
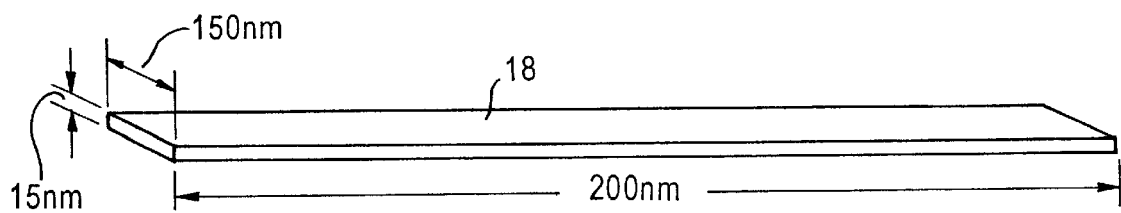
FIGS. 5A, 5B and 5C respectively depict bit configurations for conventional magnetic recording disks, quantum magnetic disks, and micro-machined disks according to the present invention.

FIG. 5A depicts a representation of a bit on a conventional magnetic longitudinally recorded disk having a continuous magnetic layer with a recording density of approximately 1.7 Gbit/in$^2$. This exemplary bit is approximately 2,000 nm in length, 150 nm in width, and has a 15 nm depth.

Figure 5B:
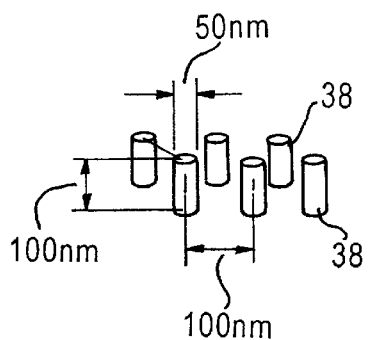

FIG. 5B displays a number of magnetic columns 38 of a quantum magnetic disk, each column 38 representing a separate bit for a quantum magnetic recording medium having a density of approximately 65 Gbit/in$^2$. The diameter of each magnetic column 38 is approximately 50 nm, and the magnetic column 38 has a depth of 100 nm. The individual columns 38 are separated (center-to-center) by approximately 100 nm.

Figure 5C:
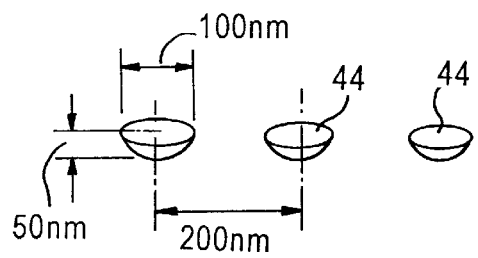

FIG. 5C depicts a plurality of single domain elements for magnetic recording on a disk manufactured in accordance with embodiments of the present invention and having a recording density of approximately 60 Gbit/in$^2$. The recesses 48 and therefore the domains 44, have average depths between approximately 20 nm and 80 nm and a radius between approximately 10 nm and 100 nm. In a preferred embodiment, depicted in FIG. 5C, the average depth of a recess 48 is approximately 50 nm and the radius is approximately 10 nm. The domains 44 are separated by approximately 100 nm (center-to-center) in the exemplary embodiment.

Figure 6:
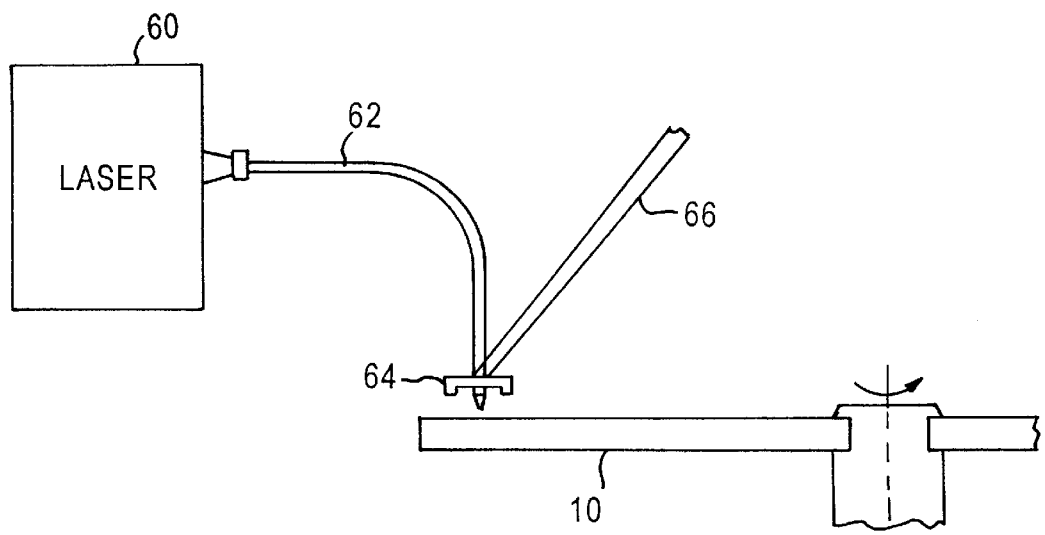
FIG. 6 is a schematic side view of a disk and an apparatus to machine recesses into the disk in accordance with embodiments of the present invention.

An exemplary arrangement for machining the recesses 48 into the top surface of a carrier layer of a magnetic recording medium is depicted in FIG. 6. The arrangement includes a double-clad fiber-laser and optics sub-system. The sub-system includes a laser 60 that produces a laser energy beam in the form of either a continuous-wave or a pulsed or modulated wave. The laser 60 may be a YAG laser, for example. It is preferable to use a modulated single-mode-quality laser to provide the micro-to-nano machining of the surface of the recording disk 10. The laser energy from the laser 60 is provided through a double-clad fiber 62, for example, to a Winchester-type slider 64 that is suspended over the disk 10 by a suspension mechanism 66.

Figure 7:
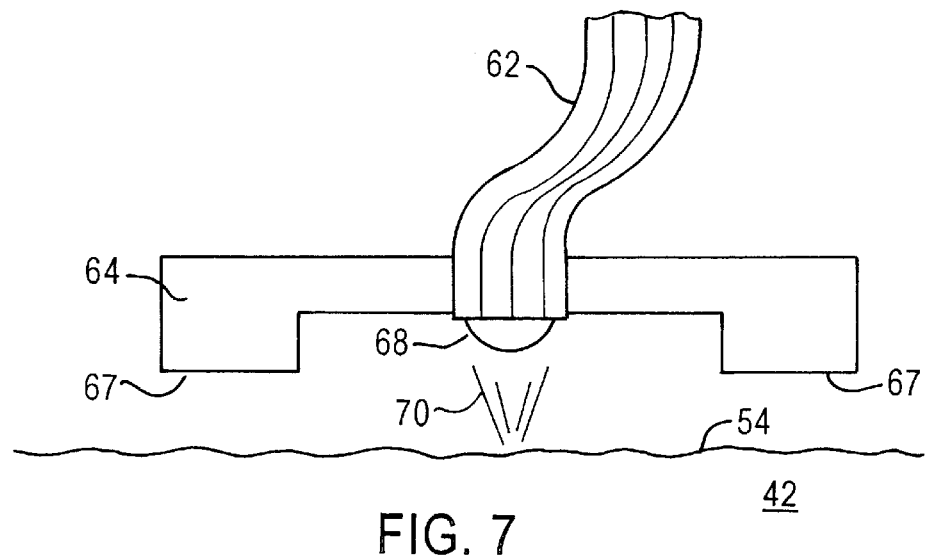
FIG. 7 is a front view of a fiber-end of the laser on a slider positioned over a media surface in accordance with the present invention.

FIG. 7 is a front view of the slider 64 flying over the top surface 54 of the non-magnetic-layer 42 of a recording disk 10. The double-clad fiber 62 is mounted at a center cavity position of the slider 64 between two slider rails 67. At the end of the fiber 62 is a focusing lens 68. The pumped laser beam is focused onto the top surface 54 of the carrier layer 42 through the lens 68. The output of the laser 60 from the lens 68 is indicated by reference numeral 70 in FIG. 7.

The configuration of the recesses 48 formed by the laser output 70 may be altered from the parabolic shape in FIG. 5C by changing the lens 68, as can be readily appreciated. Hence, the parabolic shape depicted in FIG. 5C may be elliptically shaped, rectangularly shaped, etc., depending on the configuration of the lens 68 that is employed.

The sub-micron recesses 48 are made by focusing the lens 68 very close to the top surface 54 of the carrier layer 42, by using the fiber laser on the Winchester slider 64 technique described above. The diameter d of the focus spot of the laser is given by the equation: focus spot diameter $d=(F/D)\lambda$, where D is the fiber-laser beam size, F is the focusing length and $\lambda$ is the wavelength of the laser 60. To create recesses with the dimensions depicted in FIG. 5C, (i.e., the spot size approximately 20 nm in diameter), a slider 64 flying at 500 nm (20$\mu$") high with a fiber laser of diameter 0.025 mm and a wavelength of 1.064 $\mu$m may be used. Alternatively, to create the same size recesses, a slider 64 flying at 1000 nm (40$\mu$") high with a fiber laser of diameter 0.025 mm and a wavelength of 0.532 $\mu$m may be employed.

The use of a slider 64 with a mounted fiber-laser allows precision micro- and nano-machining since the slider 64 will maintain a substantially constant height over the top surface 54 of the carrier layer 42 of the disk 10. This will produce recesses 48 of consistent depth and size. The height of the slider 64 may be precisely controlled by controlling the speed at which the disk 10 is rotated. Based on the rotation speed, the laser energy is applied in a pulsed fashion to produce individual recesses that are isolated from one another. As an example, if a laser having a wavelength of 1.064 $\mu$m and a beam diameter of 0.025 mm is used, and the spot size is to be 20 nm, then the slider 64 needs to maintain a flying height of 500 nm (20$\mu$"). Although the flying height will normally need to be calibrated for a particularly configured slider (of 50% or 70% form factor) and suspension configuration, for this example assume that a rotation speed of 1,000 rpm will produce the desired flying height of 500 nm (20$\mu$"). The frequency of the application of laser energy will then be 10 MH$_z$ to provide recesses 48 adequately spaced from each other on the same track so as to ensure that domains 44 on the same track are isolated from one another.

The laser 60 needs to have a power output sufficient to melt or ablate the carrier layer 42. When pulsed at a frequency of 10 MH$_z$, the power output of the laser may be 1 $\mu$J in certain exemplary embodiments. The power output would be changed depending on the amount of time the laser energy is applied over each recess area. Hence, if the disk is rotated faster during the machining process to maintain a greater speed, a higher power laser is required to adequately machine the recesses than if the disk is rotated at a slower speed.

Figure 8A:
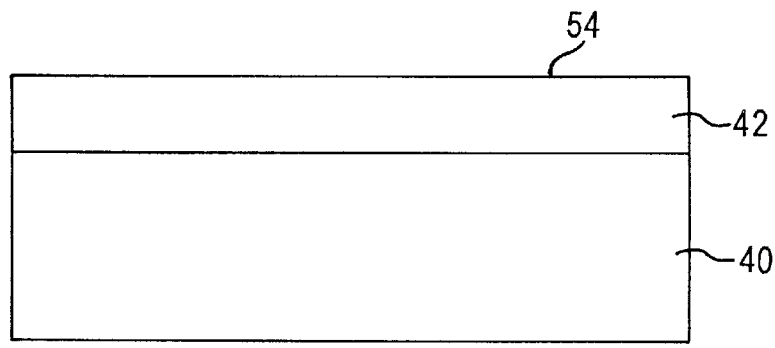
FIGS. 8A–8E depict a cross-section of a magnetic recording medium in various stages of processing according to embodiments of the method of the present invention.

An exemplary embodiment of the process of producing a magnetic recording medium with isolated domains such as shown in FIGS. 4A and 4B is provided in FIGS. 8A–8E. As depicted in FIG. 8A, the starting materials for the process include a substrate layer 40 and a non-magnetic carrier layer 42. A wide variety of different types of substrate materials may be used such as Ni/P, Al, glass, MMC, ceramic, AlBC, etc. The non-magnetic carrier layer 42, which acts as an isolation layer to isolate the domains 44, may also be made of a variety of materials, such as chromium (Cr), silicon (Si), etc.

Figure 8B:
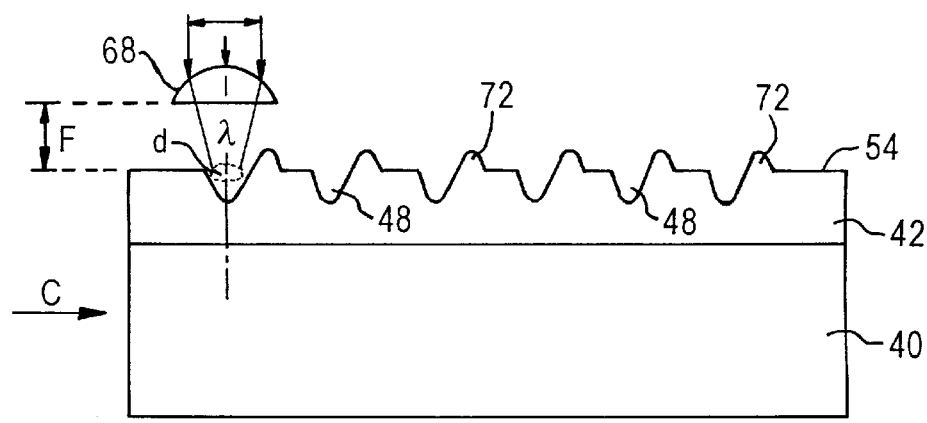

FIG. 8B depicts the step of laser micro-machining in which the laser energy is focused on the top surface 54 of the carrier layer 42. In FIG. 8B, only the lens 68 is depicted and not the entire slider arrangement 64. As the recording medium is moved in the direction of arrow C in FIG. 8B, a series of recesses 48 is created by the application of the laser energy emitted from the lens 68. The geometry producing the spot size d is provided in FIG. 8B. Hence, where the spot size d is desired to be 20 nm, the focusing length F may be 500 nm (20$\mu$") and the diameter D of the laser beam may be 25 $\mu$m, if a laser beam light wavelength of 1.064 $\mu$m is used. The laser beam may be either a continuous wave, or a pulsed or modulated laser beam. In the creation of the recesses 48, the material removed from the recesses 48 collects on one side of the recess 48 and forms a projection 72 from the top surface 54 of the carrier layer 42. The projection 72 will be removed in a later processing step.

Figure 8C:
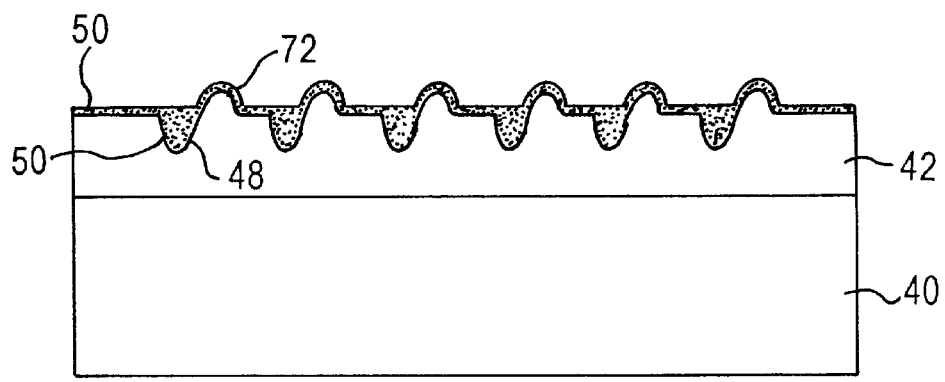

FIG. 8C depicts the magnetic recording medium after the magnetic material 50 has been applied over the entire top surface 54 of the carrier layer 42. A magnetic material, such as nickel, cobalt, or a magnetic alloy is applied, by electroplating or sputtering, for example. The electroplating or sputtering of the magnetic material covers the entire top surface 54 of the carrier layer 42 with the magnetic material 50, and fills the recesses 48 in the carrier layer 42 with magnetic material 50.

Figure 8D:
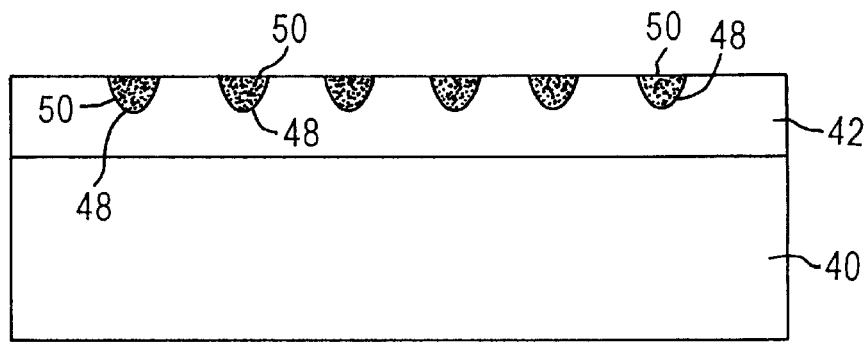

The magnetic material 50 is removed from the top surface 54 of the carrier layer 42 through chemical-mechanical polishing, for example. The magnetic recording medium is depicted in FIG. 8D after the chemical-mechanical polishing process has been completed. The polishing also removes the projections 72 from the carrier layer 42. The only magnetic material 50 remaining on the carrier layer 42, following the chemical-mechanical polishing step, is the magnetic material 50 remaining within the recesses 48. This forms the isolated single-magnetic domains 44 that are isolated from each other by the non-magnetic carrier layer 42.

Figure 8E:
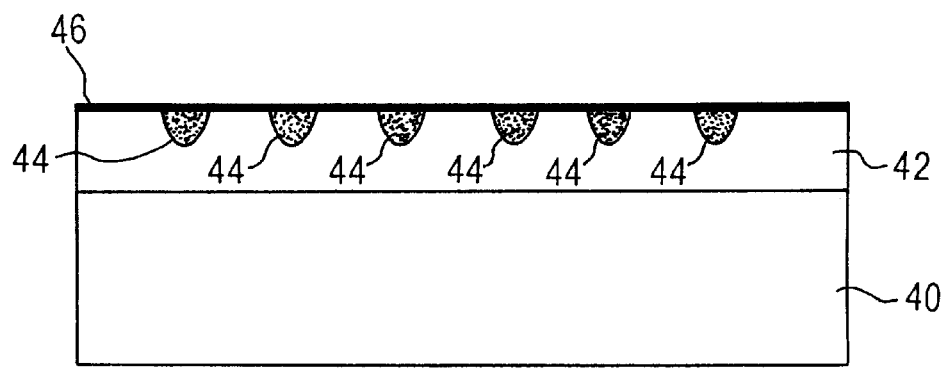

Following the chemical-mechanical polishing, a conventional carbon overcoating layer 46 is applied, by a sputtering process, for example. The final product after overcoating is depicted in FIG. 8E.

The process producing the magnetic recording media is less expensive than semiconductor processes proposed for quantum magnetic disks, since masking and reactive ion etching steps commonly employed in semiconductor processing and proposed in the manufacture of quantum magnetic disks, are not required. Furthermore, throughput is higher. Hence, the present invention described above provides a magnetic recording media that has a storage density two orders of magnitude greater than conventional magnetic recording media and yet may be manufactured in a cost-effective and practically realizable manner in accordance with embodiments of the present invention.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein. For example, although the recording media has been illustrated as a disk, the media may take other forms.

What is claimed is:

1. A magnetic recording medium, comprising:
   a non-magnetic carrier layer having an upper surface; and
   a plurality of spaced-apart recesses formed in said upper surface of said carrier layer, each of said recesses being filled with a magnetic material comprising an isolated, single magnetic domain, the width of each of said recesses being about twice the depth of said recesses.

2. The medium of claim 1, wherein:
   each of said recesses is parabolically shaped.

3. The medium of claim 1, wherein:
   each of said recesses has a width of about 100 nm and a depth of about 50 nm.

4. The medium of claim 3, wherein:
   the medium is in the form of a disk and said recesses are arranged in a plurality of concentric, radially spaced-apart tracks.

5. The medium of claim 4, wherein:
   the center-to-center spacing between recesses of adjacent tracks is about 200 nm.

6. The medium of claim 1, wherein:
   a substrate underlies the carrier layer and a protective overcoat layer overlies the carrier layer.

7. The medium of claim 6, wherein:
   said substrate comprises a material selected from the group consisting of NiP, Al, glass, ceramic, MMC, and AlBC; and
   said protective overcoat layer comprises carbon.

8. The medium of claim 1, wherein:
   said non-magnetic material of said carrier layer comprises a material selected from Cr, Si, other non-magnetic metals, and non-magnetic non-metals.

9. The medium of claim 1, wherein:
   said magnetic material forming said single magnetic domains comprises a magnetic material selected from Ni, Co, and magnetic alloys.

10. A method of manufacturing a magnetic recording medium, comprising the sequential steps of:
    providing a non-magnetic carrier layer having an upper surface;
    forming a plurality of spaced-apart recesses in the upper surface of said carrier layer by means of laser micro-machining, the width of each of said recesses being about twice the depth of said recesses; and
    filling each of said recesses with a magnetic material to form a plurality of isolated, single magnetic domains.

11. The method according to claim 10, wherein:
    said step of laser micro-machining comprises scanning focussed, pulsed laser energy over said upper surface of said non-magnetic carrier layer, utilizing a slider operating at a controlled, substantially constant flying height over said upper surface of said carrier layer.

12. The method according to claim 10, wherein:
    each of said recesses formed in said carrier layer by said laser micro-machining is parabolically shaped.

13. The method according to claim 10, wherein:
    each of said recesses formed in said carrier layer by said laser micro-machining has a width of about 100 nm and a depth of about 50 nm.

14. The method according to claim 13, wherein:
    the medium is in the form of a disk, said recesses are arranged in a plurality of concentric, radially spaced-apart tracks, and the center-to-center spacing between recesses of adjacent tracks is about 200 nm.

15. The method according to claim 10, wherein:
    said step of filling said recesses with a magnetic material includes at least one method selected from electroplating and sputtering of said magnetic material.

16. The method according to claim 15, wherein:
    said step of filling said recesses with a magnetic material further includes a subsequent step of planarizing said upper surface of said carrier layer to remove excess magnetic material therefrom.

17. The method according to claim 14, wherein:
    said step of planarizing comprises chemical-mechanical polishing said upper surface of said carrier layer.

18. The method according to claim 10, wherein:
    said step of providing a non-magnetic carrier layer comprises providing a carrier layer on an underlying substrate; and
    the method further comprises forming a protective overcoat layer over said carrier layer after said recess-filling step.

19. A magnetic recording medium comprising:
    a non-magnetic carrier layer; and
    a plurality of magnetic means comprising spaced-apart, single-domain magnetic particles embedded within said carrier layer, each of said magnetic particles having a width dimension about twice as great as a depth dimension.

20. The magnetic medium according to claim 19, wherein:
    said plurality of magnetic means are arranged in concentric, radially spaced-apart tracks.

* * * * *